United States Patent [19]

Zoboli

[11] Patent Number: 4,817,993
[45] Date of Patent: Apr. 4, 1989

[54] DIELECTRIC JOINT, PARTICULARLY FOR METALLIC CONDUITS FOR LIQUIDS AND/OR GASES

[76] Inventor: Walter Zoboli, Via Prampolini 30, 40143 Formigine (Providence of Modena), Italy

[21] Appl. No.: 39,134

[22] Filed: Apr. 16, 1987

[30] Foreign Application Priority Data

Apr. 18, 1986 [IT] Italy .................. 28969/86[U]

[51] Int. Cl.⁴ .................. F16L 21/00; F16J 15/02; H02G 15/08
[52] U.S. Cl. .................. 285/54; 277/207 A; 174/85
[58] Field of Search ............. 277/207 A, 901; 285/54, 285/48, 47, 55; 174/85

[56] References Cited

U.S. PATENT DOCUMENTS

| | | | |
|---|---|---|---|
| 3,485,517 | 12/1969 | Howe | 285/54 X |
| 3,503,633 | 3/1970 | Braun et al. | 285/54 |
| 3,656,771 | 4/1972 | Stout | 277/207 A |
| 3,722,925 | 3/1973 | Robbins | 285/55 |
| 3,782,419 | 1/1974 | Hanson | 285/47 X |
| 4,427,200 | 1/1984 | Ikeyama et al. | 277/207 A X |

Primary Examiner—Stuart S. Levy
Assistant Examiner—Lynn M. Sohacki
Attorney, Agent, or Firm—Guido Modiano; Albert Josif

[57] ABSTRACT

The joint comprises a first end portion to be coupled and shaped like a sort of cup, in which a second portion, shaped like a flange, and to be joined to the first one, is insertable, wherein the second portion is internally occupied for a section by a precision seating recess, for a cylindrical element of highly insulating material, and flush to the inner wall of the conduit. The end of the cylindrical element, facing towards the bottom of the cup, has a radially directed annular projection for the constant separation of the flange from the bottom of the cup, the projection axially and sealingly engaging with an annular gasket, and being provided with a collar for the blocking therein. The gasket is interposed between the side of the flange, facing towards the bottom of the cup, and the cup, and between the inner lateral walls thereof, the gasket being also provided with position blocking teeth, between the outer walls of the flange and the inner walls of the cup there being furthermore placed elements for the electric insulation and the stiffening of the joint.

11 Claims, 1 Drawing Sheet

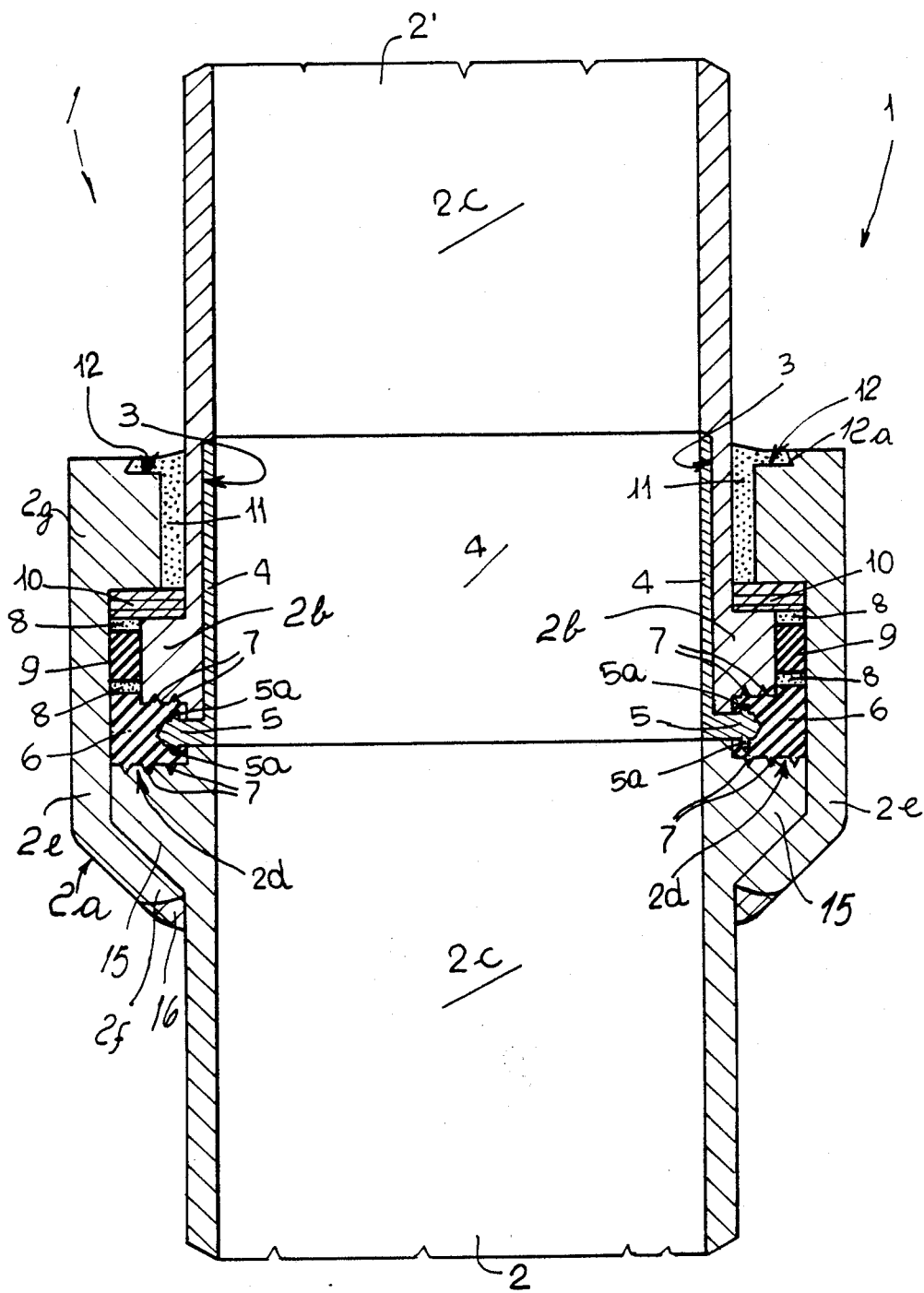

DIELECTRIC JOINT, PARTICULARLY FOR METALLIC CONDUITS FOR LIQUIDS AND/OR GASES

BACKGROUND OF THE INVENTION

The present invention relates to an dielectric joint, particularly for metallic conduits for liquids and/or gas.

The use of metallic conduits for the conveyance and the transport of material, both in the liquid state and in the gaseous state, has been known for some time.

Such conduits, due to their length, require joints, which are the subject of particular studies aimed at their production, in order to meet the multiple characteristics required both to increase their durability with time and to cause them to resist to the stresses of various kinds to which they are subject underground, and also to comply with the norms which regulate their construction.

Joints are known, designed according to the abovesaid aims, which however do not perfectly meet expectations: in some cases, for example, the mechanical flexing resistance has proved to be not sufficient in said joints, compromising their seal.

In other cases, infiltrations of transported liquids between the elements which compose said joint have occurred, with the consequent accidental conduction of current between said component elements, which event, above all other defects, is on the contrary desirable to avoid absolutely.

Together with the above, particular care must also be placed in the ability of the joint both to avoid hydraulic load losses, and to avoid altering the optimum flow of the fluids conveyed and to withstand the severe tests imposed, as mentioned, by the applicable norms.

SUMMARY OF THE INVENTION

The technical aim of the present invention is to eliminate all the disadvantages of the prior art, by providing an improved dielectric joint, particularly for metallic conduits for liquids and/or gases which ensures a complete dielectricity, associated with a high mechanical resistance and a high resistance to wear in, which has an absolute seal, all in compliance with the Government norms which regulate their construction.

A further and not least object of the present invention is to provide an improved dielectric joint, particularly for metallic conduits for liquids and/or gases which is easy to manufacture and to install and, finally, substantially modest in cost.

This aim and other objects are achieved by an improved dielectric joint, particularly for metallic conduits for liquids and/or gases, of the type comprising a first cup-like shaped end portion of a first conduit length, in which a second flange-like shaped end portion, of a second conduit length to be joined to said first one, is inserted, characterized in that said second end portion integrally presents a precision seating recess accomodating a cylindrical element, of highly insulating material, extending flush to the inner wall of said first conduit length, the end of said cylindrical element facing towards the bottom of the cup, having a radial annular end projection for the constant separation of said flange-like portion from the bottom of said cup-like portion, said projection compenetrating axially and sealingly an annular gasket, and being provided with means for blocking therein, said gasket being interposed between the side of said flange-like portion facing towards the bottom of said cup-like portion and said cup and between the inner lateral walls thereof, said gasket being also provided with position blocking means, between the outer walls of said flange and the inner walls of said cup there being furthermore placed electric insulation elements for the electrical insulation and the stiffening of said joint.

BRIEF DESCRIPTION OF THE DRAWINGS

Further characteristics and advantages of the invention will become apparent from the detailed description of an improved dielectric joint, particularly for metallic conduits for liquids and/or gases, according to the invention, illustrated only by way of non-limitative example in the accompanying drawing table, where the single FIGURE illustrates the invention in longitudinal cross section.

DESCRIPTION OF A PREFERRED EMBODIMENT

More in detail, the reference numeral 1 indicates an improved dielectric joint, particularly for metallic conduits for liquids and/or gases, which comprises a first cup-like shaped end portion 2a of a first conduit length 2 to be joined, in which is inserted a second counterposed flange-like shaped end or head portion 2b, of a second conduit length 2 to be joined to the first length 2. As visible, the cup-like portion 2a includes an enlarged end or head portion 15 monolithic with the length 2 and a ring element 2e, welded to portion 15 at 16, which surrounds the flange-like portion 2b. Furthermore the conduit lengths 2 and 2' define inner surfaces which are flush to each other, while the ring element 2e has an enlarged end portion 2g surrounding the conduit end 2' and having smaller inner diameter than the outer diameter of flange 2b. The ring element 2e has a second end portion 2f countershaped and in contact with the conduit length 2.

The second portion 2b internally presents, for a selected portion, a precision seating recess 3 for accomodating therein a cylindrical element 4, of electrically insulating material which, with its internal wall extends flush to the inner wall 2c of the conduit lengths 2, 2'. The cylindrical element 4 at the end directed towards the bottom 2d of the cup-like portion 2a, ends with an annular projection 5, which is directed radially, for the constant separation of the flange-like portion 2b from the bottom 2d of the cup-like portion 2a.

The projection 5 is provided with a perimetral collar 5a which constitutes means for blocking said projection in an annular gasket 6, interposed between the side of the flange 2b facing towards the bottom 2d of the cup-like portion 2a and the ring element 2e of the cup-like portion 2a, and provided with means for blocking in position, constituted by a series of small teeth 7 which project outwards therefrom and penetrate in related complementary holes provided both in the bottom 2d of the cup 2a and in the side of the flange 2b directed towards the cup bottom. Between the outer walls of the flange 2b and the inner ones of the ring element 2e of the cup 2a, stiffening means for the joint 1 are arranged, each of which consists of a casting 8 of a material such as resin in which bars 9 of rigid and highly dielectric material such as the one commercially available as "EPOVIT" are buried; electric insulation elements are furthermore provided, also arranged between the outer walls of the flange 2b and the inner ones of the ring 2e of the cup 2a, and including a further annular gasket 10 of mixed material, also with highly insulating and rigid characteristics.

To close the entire joint, a casting 11 of polymerized resin is provided in the annular interspace formed between the enlarged end 2g and the conduit 2'. As visible, the enlarged end portion 2g has an annular recess 12 having a transverse side 12a facing the conduit 2' and defining a variable distance from the conduit 2' itself. In detail, such distance increases towards the flange 2b to form a dovetail joint with the casting 11.

The assemblying of the joint is as follows: first, the end portion 2a is positioned on a known machine which has the specific function of keeping all the elements which compose the joint 1 centered during their assembly.

Subsequently, the annular gasket 6 and the cylindrical element 4 are positioned coaxially with respect to said end 2a; the projection 5 is previously inserted by pressing in said gasket 6, so that the assembly is simplified and the joint is more accurate.

Above the gasket 6, the resin casting 8 is then provided, and the rigid and dielectric bars 9 are buried therein and interpose in direct contact between the outer walls of the flange 2b and the inner ones of the cup 2a.

Furthermore, above said casting, the additional annular gasket 10 is placed and finally the interspace between the two elements to be connected is filled by the additional casing 11 of polymerized resin, which casting, at the end facing outwards, fills a recess 12 having a dovetail shaped cross section adapted to prevent the accidental leak out of said casting once it has hardened.

Finally, the welding of the element 2e, which constitutes the abovesaid walls of the cup 2a, to the outer walls of the conduit, is performed.

In practice, it has been observed that the invention thus described achieves the intended aims.

The invention thus conceived is susceptible to numerous modifications and variations, all of which are within the scope of the inventive concept.

Moreover, all the details may be replaced with technically equivalent elements.

In practice, the materials employed, as well as the dimensions, may be any according to the requirements without thereby abandoning the scope of the following claims.

I claim:

1. A dielectric joint, in particular for metal conduits for liquids and gases, comprising:
    - a first conduit length having a first outwardly protruding enlarged head, said first conduit length having a first inner surface and defining an inner annular recess extending at least at said first enlarged head, and said first enlarged head defining an outer diameter,
    - a second conduit length having a second outwardly protruding enlarged head facing towards said first enlarged head, said second conduit length having a further inner surface aligned to said first inner surface of said first conduit length,
    - a ring element surrounding said first and second enlarged heads, said ring element having an enlarged end portion surrounding said first conduit length at a portion of said first conduit length arranged near said enlarged head, said enlarged end portion of said ring element defining an annular interspace with said first conduit length and having an inner diameter which is smaller than said outer diameter of said first enlarged head of said first conduit portion, said ring element further having a second end portion countershaped to and in contact with said second enlarged head and welded to said second conduit length,
    - a cylindrical element of highly electrical insulating material, said cylindrical element extending in said inner annular recess of said first conduit length and having a cylindrical inner surface extending flush with said inner surfaces of said first and second conduit lengths, said cylindrical element having a radial projection outwardly protruding and partially extending between said first and said second enlarged heads,
    - an annular gasket extending among and in contact with said first and second enlarged heads, said radial projection and said ring element, said annular gasket having first engagement means cooperating with said first and second enlarged heads and said radial projection for position blocking,
    - electric insulation elements and stiffening elements interposed between said ring element and said first conduit length and filling said annular interspace, said electric insulation and stiffening elements defining further engagement means engaging with said enlarged end portion of said ring element.

2. A joint according to claim 1, wherein said first engagement means of said annular gasket comprises tooth formations protruding from said annular gasket towards said first and secon enlarged heads and engaging with corresponding recess formations defined in said first and second enlarged heads, an inner circumferential hole partially accommodating said annular projection, and annular cavities formed in said hole and accommodating corresponding collar elements formed on said annular projection.

3. A joint according to claim 1, wherein said electric insulation elements comprise a further annular gasket of highly dielectric material extending between said enlarged end portion of said ring element and said first enlarged head of said first conduit length and a closure casting of polimerized type resin, extending in said annular interspace between said enlarged end portion of said ring element and said first conduit length.

4. A joint according to claim 3, wherein said enlarged end portion of said ring element defines an annular recess having a transverse side facing said first conduit length and defining a variable distance from said first conduit length, with said variable distance increasing towards said further annular gasket, said annular recess being filled with said closure casting and defining therewith a dovetail joint.

5. A joint according to claim 1, wherein said stiffening elements comprise rigid highly dielectric bars and a casting of resin-like material interposed between said ring element and said first enlarged head.

6. A dielectric joint, in particular for metal conduits for liquids and gases, comprising:
    - a first conduit length having a first outwardly protruding enlarged head, said first conduit length having a first inner surface and defining an annular recess extending at least at said first enlarged head, and said first enlarged head defining a first outer diameter,
    - a second conduit length having a second outwardly protruding enlarged head facing towards said first enlarged head, said second enlarged head defining a second outer diameter larger than said first outer diameter, said second conduit length having a second inner surface aligned with said first inner surface of said first conduit length, a ring element surrounding said first and second enlarged heads, said ring element having an enlarged end portion surrounding said first conduit length at a portion of said first conduit length arranged near said enlarged head, said enlarged end portion of said ring element defining an annular interspace with said first conduit length and having an inner diameter which is smaller than said first outer diameter of said first enlarged head of said first conduit portion, said ring element further having a second end portion countershaped to and in contact with said second enlarged head, said second end portion being welded to said second conduit length, a cylindrical element of highly electrical insulating material, said cylindrical element extending in said inner annular recess of said first conduit length and having a cylindrical surface extending flush with said inner surfaces of said first and second conduit lengths, said cylindrical element having a radial projection outwardly protruding and partially extending between said first and said second enlarged heads, an annular gasket extending among said first and second enlarged heads, said radial projection and said ring element, said annular gasket having an inner circumferential hole partially accommodating said radial projection, said annular gasket further having first engagement means cooperating with said first and second enlarged heads and second engagement means cooperating with said radial projection for position blocking, electric insulation elements and stiffening elements interposed between said ring element and said first conduit length and filling said annular interspace, said electric insulation and stiffening elements having third engagement means engaging with said enlarged end portion of said ring element.

7. A joint according to claim 6, wherein said second engagement means of said annular gasket comprises annular cavities formed in said circumferential hole and accommodating corresponding collar elements formed on said annular projection and extending towards said first and second enlarged heads.

8. A joint according to claim 6, wherein said electric insulation elements comprise a further annular gasket of highly dielectric material extending between said enlarged end portion of said ring element and said first enlarged head of said first conduit length and a closure casting of polimerized type resin, extending in said annular interspace between said enlarged end portion of said ring element, and said first conduit length.

9. A joint according to claim 8, wherein said enlarged end portion of said ring element defines an annular recess having a transverse side facing said first conduit length and defining a variable distance from said first conduit length, with said variable distance increasing towards said further annular gasket, said annular recess being filled with said closure casting and defining therewith a dovetail joint.

10. A joint according to claim 6, wherein said stiffening element comprise rigid highly dielectric bars and a casting of resin-like material interposed between said ring element and said first enlarged head.

11. A dielectric joint, in particular for metal conduits for liquids and gases, comprising:

a first conduit length having a first outwardly protruding enlarged head, said first conduit length having a first inner surface and defining an inner annular recess extending at least at said first enlarged head, and said first enlarged head defining a first outer diameter, a second conduit length having a second outwardly protruding enlarged head facing towards said first enlarged head, said second enlarged head defining a second outer diameter larger than said first outer diameter, said second conduit length having a second inner surface aligned with said first inner surface, a ring element surrounding said first and second enlarged heads, said ring element having an enlarged end portion surrounding said first conduit length at a portion of said first conduit length arranged near said enlarged head, said enlarged end portion of said ring element defining an annular interspace with said first conduit length and having an inner diameter which is smaller than said first outer diameter of said first enlarged head of said first conduit portion, said enlarged end portion of said ring element defining an annular end recess having a transverse side facing said first conduit length and having a variable distance therefrom, with said variable distance increasing towards said first enlarged head, said ring element further having a second end portion countershaped to and in contact with said second enlarged head, said second end portion being welded to said second conduit length, a cylindrical element of highly electrical insulating material, said cylindrical element extending in said inner annular recess of said first conduit length and having a cylindrical inner surface extending flush with said inner surfaces of said first and second conduit lengths, said cylindrical element having a radial projection outwardly protruding and partially extending between said first and said second enlarged heads, an annular gasket extending among said first and second enlarged heads, said radial projection and said ring element, said annular gasket having an inner circumferential hole partially accommodating said radial projection, said annular gasket further having first enegagement means copperating with said first and second enlarged heads and second engagement means cooperating with said radial projection for position blocking, electric insulation elements and stiffening elements interposed between said ring element and said first conduit length, said electric elements including a closure casting of polimerized type resin filling said annular interspace and said end annular recess and defining with said end annular recess a dovetail joint.

* * * * *